(12) United States Patent
Schuller et al.

(10) Patent No.: US 7,523,473 B2
(45) Date of Patent: Apr. 21, 2009

(54) DISC SHAPED OPTICAL RECORD CARRIER

(75) Inventors: Josef Schuller, 5020 Salzburg (AT); Andrej Peterca, 5020 Kuchl (AT)

(73) Assignee: Sony DADC Austria AG, Anif (AT)

( * ) Notice: Subject to any disclaimer, the term of this patent is extended or adjusted under 35 U.S.C. 154(b) by 446 days.

(21) Appl. No.: 10/901,799

(22) Filed: Jul. 29, 2004

(65) Prior Publication Data
US 2005/0102693 A1 May 12, 2005

(30) Foreign Application Priority Data
Jul. 30, 2003 (EP) .................................. 03017273

(51) Int. Cl.
*G11B 7/24* (2006.01)
(52) U.S. Cl. .................... 720/721; 369/282
(58) Field of Classification Search ............ 369/94, 369/280, 282, 289.1, 290.1; 720/695, 703, 720/714, 721, 706–709
See application file for complete search history.

(56) References Cited

U.S. PATENT DOCUMENTS

| 4,433,410 | A | | 2/1984 | Siryj et al. |
| 4,669,076 | A | * | 5/1987 | Broom et al. ............... 720/706 |
| RE35,947 | E | * | 11/1998 | Kosinski et al. ............ 428/64.1 |
| 6,177,168 | B1 | * | 1/2001 | Stevens .................... 428/64.1 |
| 6,319,580 | B1 | | 11/2001 | Araki et al. |
| 6,507,559 | B1 | * | 1/2003 | Iwaki ..................... 369/275.5 |
| 6,532,210 | B2 | * | 3/2003 | Park ......................... 369/282 |
| 6,570,837 | B1 | * | 5/2003 | Kikuchi et al. ........... 369/275.1 |
| 6,743,527 | B2 | * | 6/2004 | Hisada et al. ............. 428/846.9 |
| 2001/0043555 | A1 | * | 11/2001 | Hisada et al. ............... 369/290 |
| 2002/0075794 | A1 | * | 6/2002 | Park ........................... 369/282 |
| 2006/0140108 | A1 | * | 6/2006 | Schreiber ................ 369/275.1 |

FOREIGN PATENT DOCUMENTS

| EP | 0 314 010 | 5/1989 |
| EP | 7-235083 | 9/1995 |
| EP | 0 821 353 | 1/1998 |
| GB | 2 380 595 | 4/2003 |
| JP | 11 232701 | 8/1999 |
| WO | WO 99/49458 | 9/1999 |
| WO | WO 03030152 A2 * | 4/2003 |
| WO | WO 2004044908 A1 * | 5/2004 |

OTHER PUBLICATIONS

Machine translation of JP 11-232701, Aug. 27, 1999.*
"Disk With Groove on Outer Disk Side Wall" IBM Technical Disclosure Bulletin, IBM Corp. New York, US, vol. 39, No. 4, Apr. 1, 1996, pp. 9-10, XP000587403.

* cited by examiner

*Primary Examiner*—Andrea L Wellington
*Assistant Examiner*—Nathan Danielsen
(74) *Attorney, Agent, or Firm*—Oblon, Spivak, McClelland, Maier & Neustadt, P.C.

(57) ABSTRACT

A disc shaped optical record carrier with special disc shape modifications at the inner edge (edge of the centre hole), and/or the clamping area, and/or the outer edge (edge in rim area) is provided so that a disc that is thicker than the currently manufactured discs can be properly played back although the current playback devices are adapted to the thinner currently manufactured discs.

10 Claims, 6 Drawing Sheets

DISC SHAPED OPTICAL RECORD CARRIER

BACKGROUND OF THE INVENTION

This invention relates to disc shaped optical record carriers, such as CDs, DVDs and their combination, so-called hybrid discs. Various standards for CDs and DVDs in respect to their different formats and also in respect to their dimensions are known.

For example the standard ECMA-130 in respect to data interchange on read-only 120 mm optical data discs (CD-ROM) defines the dimensions of the centre hole, the clamping area and the rim area of CD-ROMs comparable to the general specification of CDs. Here all diameters are referred to the centre of the centre hole or to reference planes P and Q, with reference plane P as to be the plane on which the bottom surface of the clamping area, i.e. on the read-out side of the disc, rests and reference plane Q the parallel plane to reference plane P at the height of the top surface of the clamping area, i.e. on the label side of the disc.

In particular, the centre hole shall have a cylindrical shape and its diameter shall be 15.1 mm+0.1 mm−0.0 mm, i.e. between 15.0 mm and 15.1 mm, the bottom edge of the centre hole may have a chamfer at an angle of 45° or this edge may be rounded off with a radius of not greater than 0.1 mm and the top edge of the centre hole may present burrs. Further, the bottom surface of the clamping area shall be flat within 0.1 mm and shall lay on reference plane P, the top surface of the clamping area shall be parallel to reference plane P within 0.2 mm and it defines reference plane Q, as indicated above. The height of the top surface of the reference plane P shall be 1.2 mm+0.3 mm−0.1 mm, i.e. between 1.1 mm and 1.5 mm. Further it is defined that the rim shall have a diameter of 120.0 mm±0.3 mm, i.e. between 119.7 mm and 120.3 mm and that in the zone extending between 117.7 mm to 118.3 mm and the rim the thickness of the disc is permitted to be higher than the height of the label above the reference plane P, which lays within the range of the height of the top surface above reference plane P, i.e. within the range of reference plane Q, or to decrease within certain ranges.

Further, standard ECMA-267 which is related to a 120 mm DVD-read-only disc defines the dimensional characteristics similar to that of general DVDs so that the disc shall have an overall diameter of 120.0 mm±0.3 mm, the centre hole of a substrate or a dummy substrate shall have a diameter of 15.0 mm+0.15 mm−0.0 mm, i.e. between 15.0 mm and 15.15 mm, wherein the diameter of the hole of an assemble disc, i.e. with both parts bonded together, shall be 15.0 mm min., that there shall be no burr on both edges of the centre hole and that the edge of the centre hole shall be rounded off or chamfered, wherein the rounding radius shall be 0.1 mm max and the chamfer shall extend over a height of 0.1 mm max. Further, it is defined that the clamping zone shall have a thickness of 1.2 mm+0.2 mm−0.1 mm, i.e. between 1.1 mm and 1.4 mm. It is also defined that within the rim area the outer edges of the disc shall be either rounded off with a rounding radius of 0.2 mm max. or be chamfered over within certain ranges.

Although it is defined for DVDs that the thickness of the disc, including adhesive layer, spacer(s) and label(s) shall be 1.20 mm+0.3 mm−0.06 mm, i.e. between 1.14 mm and 1.5 mm, and that also the height of the label of a CD above the reference plane P shall be 1.2 mm+0.3 mm−0.1 mm, i.e. between 1.1 mm and 1.5 mm, wherein the thickness of the transparent substrate shall be 1.2 mm±0.1 mm, i.e. between 1.1 mm and 1.3 mm with the bottom surface of the transparent substrate lying on the reference plane P, there is the tendency that the manufactured discs are as thin as possible to save polycarbonate material and time needed to cool the moulded substrates. Further, it is observed that the clamping areas lay generally in the plane of the information areas of the disc, although other configurations would be within the respective specifications, since such a configuration is easier to manufacture.

Hybrid discs, which comprise one DVD substrate and one CD substrate bonded together at their respective non-readable sides, i.e. so that the DVD substrate is read from one side and the CD substrate is read from the other side, show a height of approximately 1.8 mm, i.e. of a 1.2 mm CD substrate and a 0.6 mm half DVD substrate. Although it is the tendency to make such hybrid discs thinner to be within the 1.5 mm limit of maximum thickness allowed for CDs or DVDs, it is observed that many playback devices for CDs or DVDs show severe problems in handling such discs.

SUMMARY OF THE INVENTION

Therefore, it is the object underlying the present invention to provide a disc shaped optical record carrier that shows improved characteristics so that it can be better handled by existing playback devices, in particular in case the disc shaped optical record carrier has a thickness above 1.4 mm or 1.5 mm.

This object is solved by a respective disc shaped optical record carrier as described herein.

Therefore, in a first embodiment of the present invention, a disc shaped optical record carrier comprising a centre hole with a predetermined radius R1 of nominal 7.5 mm centrally around a rotational axis of the disc and forming a respective inner edge with each surface of the disc, and a clamping area on both sides of the disc, which clamping area has a respective clamping surface on each side of the disc, according to the present invention is characterized in that the disc shaped optical record carrier has a disc thickness >1.4 mm, in particular >1.5 mm, and a position of an inner edge of the centre hole is defined by a position of an inner edge of the centre hole by a distance y ≦1.4 mm+R2·sin(45'), preferably y ≦1.30 mm+R2·sin(45°), of a centre of a ball probe with radius R2 to a plane in which the clamping surface of the opposite disc side lies, when a distance x=R1−R2·sin(45°) of the centre of the ball probe to the rotational axis of the disc is given, preferably this condition is kept for both sides of the disc.

Such a disc shaped optical record carrier ensures that it can always be chucked, in particular also by drives using a ball clamping, e.g. discman, or similar clamping like clamping with wedge-shaped clamps which holds the clamping area of a read-out side of the disc against a support plate of the drive by way of spring loaded balls mounted within a mandrel on which the centre hole of the record carrier is mounted for playback of the record carrier. In particular, this disc design of the optical record carrier according to the first embodiment of the present invention secures that the disc mounted within the playback device will not wobble or rotate out-off-centre. Therewith, the playability of discs which have a thickness above the thickness between 1.1 mm and 1.3 mm of the currently manufactured discs can be played back without any disturbance also in disc players/drives using ball clamping, such as portable disc players in which ball clamping mechanisms are commonly used.

The radius R2 of the ball probe used to define the position of an inner edge of the centre hole of the disc shaped optical record carrier according to the first embodiment of the present invention is preferably between 0.5 mm and 2 mm. In this case the ball probe has a size comparable to that of the balls used in the disc players/drives using ball clamping.

The radius R1 of the centre hole of the disc shaped optical record carrier according to the first embodiment of the present invention is preferably between 7.5 mm and 7.575 mm, further preferably 7.5 mm, i.e. as specified for CDs and for DVDs.

Further, in a second embodiment of the present invention, a disc shaped optical record carrier comprising a clamping area on both sides of the disc, which clamping area has a respective clamping surface on each side of the disc according to the present invention is characterized in that the disc shaped optical record carrier has a disc thickness >1.4 mm, in particular >1.5 mm, and a distance of parallel planes through the clamping surfaces is between 1.1 mm and 1.4 mm, preferably between U1.2 mm and 1.4 mm, in particular of 1.40 mm. This disc shaped optical record carrier according to the second embodiment of the present invention secures that also in disc players/drives using a normal clamping mechanism in which a clamping stamper touches one clamping area of the disc and presses the other clamping area of the disc against a support plate of the disc player/drive can properly hold such discs, even when they have an overall thickness above 1.4 mm or above 1.5 mm.

In particular, according to this second embodiment of the present invention it is preferred that the distance of the parallel planes through the clamping surfaces is between 1.20 mm and 1.4 mm, in particular 1.40 mm also in cases in which the disc height is above 1.5 mm, i.e. according to the present invention a step is provided between at least one information readout surface and clamping area on the side of that information readout surface. In particular, in case of a hybrid optical record carrier with a CD side and a DVD side it is preferred that said step is provided on both sides of the hybrid optical record carrier or alternatively on the DVD side, i.e. the information readout surface of the CD side lies in the plane through the clamping surface on the CD side.

The disc shaped optical record carrier according to the second embodiment of the present invention preferably comprises also the features of the disc shaped optical record carrier according to the first embodiment of the present invention.

Further, in a third embodiment of the present invention, a disc shaped optical record carrier comprising an outer edge, according to the present invention is characterized in that the disc shaped optical record carrier has a disc thickness >1.4 mm, in particular >1.5 mm, and the outer edge is defined so that a distance from a rotational axis of the disc shaped optical record carrier to a crossing line L of an upper plane N and a lower plane M is a $\leq D/2 + t/2 \cdot \cot(\alpha)$, when the crossing line L is perpendicular to a rotational axis of the disc shaped optical record carrier, the lower plane M is slanted by an angel $\alpha$ in respect to a reference plane P of the disc shaped optical record carrier and touches the outer edge from below, the upper plane N is slanted by an angel $-\alpha$ in respect to the reference plane P and touches the outer edge from above, D is the nominal diameter of the disc shaped optical record carrier, $\alpha = 7.5°$, and t is the distance between a line S and a line T, wherein the line S is defined by the crossing line between a plane U and the lower plane M, the line T is defined by the crossing line between the plane U and the upper plane N, and the plane U is perpendicular to the reference plane P and in parallel to the crossing line L and at the distance D/2 from the rotational axis A.

Such a disc shaped optical record carrier according to the third embodiment of the present invention can securely be inserted into disc players/drives with slot-in mechanisms, such as multi disc players, car players, computer drives, and ejected there from, even if such a disc has a thickness above 1.4 mm or above 1.5 mm.

In particular, according to this third embodiment of the present invention it is preferred that D=120 mm.

Further, according to this third embodiment of the present invention it is preferred that $1.1 \text{ mm} \leq t \leq 1.5 \text{ mm}$, preferably $1.3 \text{ mm} \leq t \leq 1.35 \text{ mm}$.

The disc shaped optical record carrier according to the third embodiment of the present invention preferably comprises the features of a disc shaped optical record carrier according to the first and/or second embodiments of the present invention.

Therefore, it is the common concept underlying the first to third embodiments to select special disc shape modifications so that the disc that are thicker than the currently manufactured discs and/or are thicker than the current thickness specifications can be properly played back although the current playback devices are specially adapted to the currently manufactured discs.

A disc shaped optical record carrier according to anyone of the above embodiments of the present invention has preferably a thickness between 1.4 mm and 1.8 mm, further preferably between 1.4 mm and 1.6 mm, in particular between 1.5 mm and 1.56 mm. In other words, the disc shaped optical record carrier according to the present invention is thicker than the disc shaped optical record carriers manufactured today with a thickness between 1.1 mm and 1.3 mm or an average thickness of about 1.2 mm.

The disc shaped optical record carrier according to anyone of the above embodiments of the present invention is preferably a double sided optical record carrier with a DVD substrate on one side and a CD substrate on the other side, which substrates are picked together at their non-readout sides. In this case the present invention secures that such a hybrid optical record carrier can be played back in the existing disc players/drives without any problems due to an increased thickness in comparison to non-hybrid discs of the respective type manufactured today.

According to the present invention the thickness of the DVD substrate is preferably between 0.5 mm and 0.6 mm, further preferably between 0.53 mm and 0.59 mm, in particular between 0.54 mm and 0.57 mm. In other words, the DVD substrate of the disc shaped optical record carrier is preferably a half DVD substrate as commonly used and defined in the respective standards or slightly thinner than specified in the respective standards.

The thickness of the CD substrate used in the disc shaped optical record carrier according to the present invention is preferably between 0.8 mm and 1.2 mm, in particular between 0.8 mm and 1.0 mm, in particular between 0.88 and 0.94 mm. In other words, the CD substrate used for the optical record carrier according to the present invention is as thick as a normal CD or thinner, in particular only between 0.88 and 0.94 thick.

These preferred thicknesses of the CD and DVD substrates used according to the present invention secure that the total thickness of the hybrid disc shaped optical record carrier according to the present invention is still within the respective specification of a CD or a DVD or slightly thicker, but comprises the particular adapted inner edges of the centre hole and/or distance of the two clamping surfaces and/or edge shape of the rim.

In such a hybrid disc shaped optical record carrier according to the present invention a thickness of a bonding agent between the DVD substrate and the CD substrate is preferably between 0.01 mm and 0.04 mm, in particular between 0.02 and 0.03 mm, so that both substrates are securely attached to each other, but the overall thickness of the hybrid disc is not significantly increased by the bonding agent.

For a better understanding of the invention and to further elucidate the invention, its features, objects and advantages, exemplary preferred embodiments thereof are described in detail by way of example while making reference to the accompanying drawing, wherein:

DETAILED DESCRIPTION

Figure 1A:
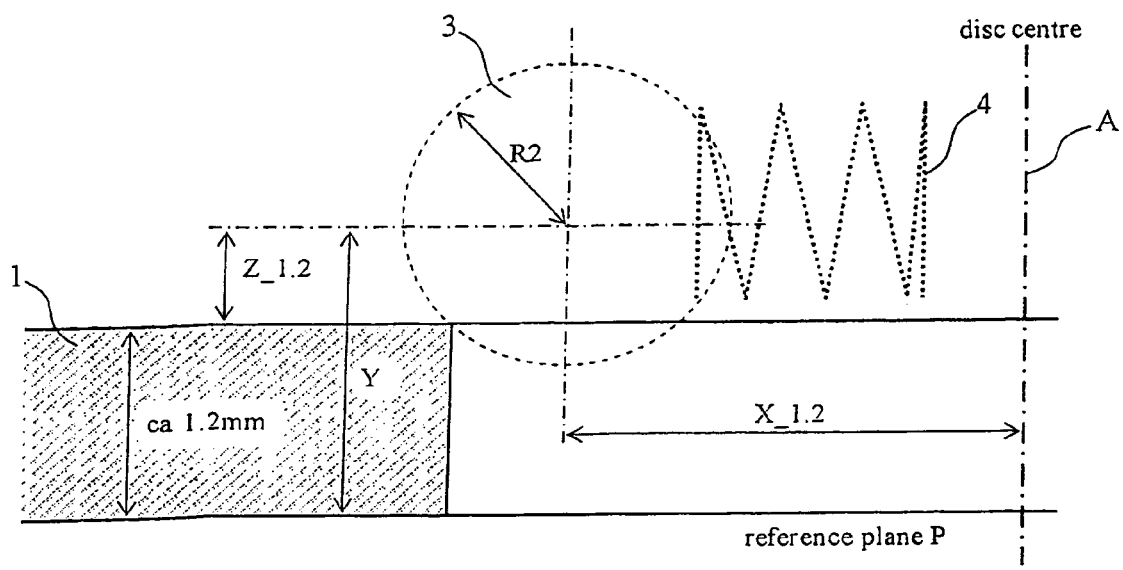
FIG. 1 shows inner edge shapes of currently manufactured discs
Figure 1B:
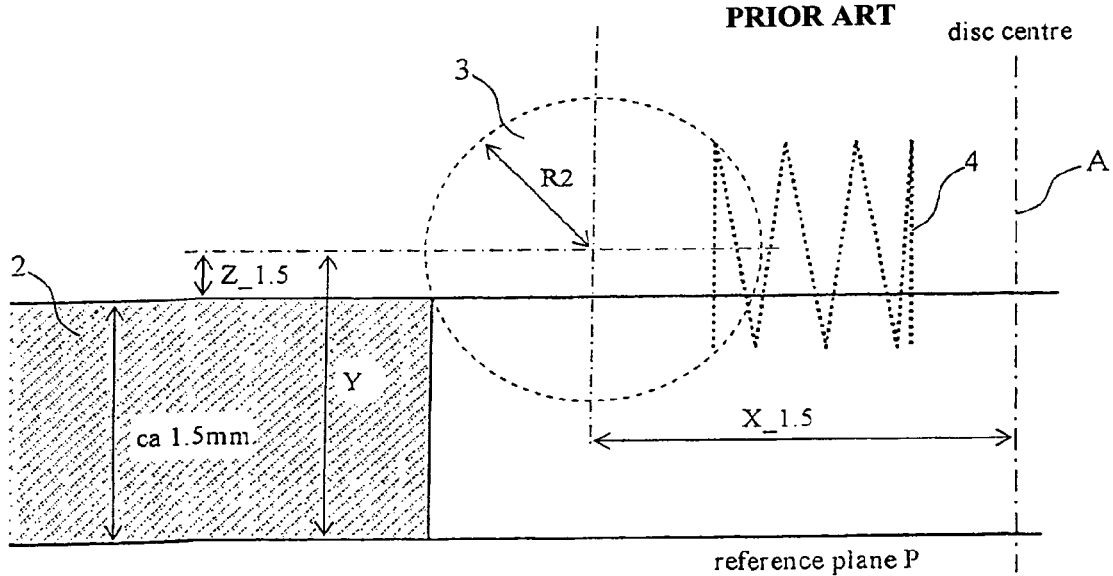

FIG. 1a schematically shows a spring loaded clamping for a conventional 1.2 mm disc 1 and FIG. 1b schematically shows a spring loaded clamping for a conventional 1.5 mm disc 2, wherein only parts of the inner area of the respective discs are shown and only the ball 3 and spring 4 of the ball clamping mechanism are shown. From FIG. 1a) it is derivable that the spring loaded ball 3, which centre has a distance X__1.2 to the disc centre, i.e. the rotational axis of the disc, and a distance of 1.2 mm+Z__1.2 from the reference plane P in case it touches the 1.2 mm thick disc can apply a force on the disc which has more or less equal components directed towards the reference plane P and parallel to the reference plane P pointing away from the disc centre. This more or less equal splitting of the force applied from the spring loaded ball 3 results from the arrangement of the ball 3 a predetermined distance above the reference plane Q and to the rotational axis A of the disc.

On the other hand, as shown in FIG. 1b) and derivable therefrom, the spring loaded ball 3 touching the 1.5 mm thick disc 2, which centre has a distance X__1.5<X__1.2 to the disc centre and a distance of 1.5 mm+Z__1.5>1.2 mm+Z__1.2 from the reference plane P, applies a force on the disc, which component directed parallel to the reference plane P and pointing away from the disc centre is larger than the component pointing towards the reference plane P. This situation is unfavourable, since the vertical force pointing towards the reference plane P, which holds the disc on the chuck, becomes too small, which might result in that the disc might wobble or rotate out-off-centre during playback. A similar situation occurs also in cases of 1.4 mm thick discs.

Figure 2A:
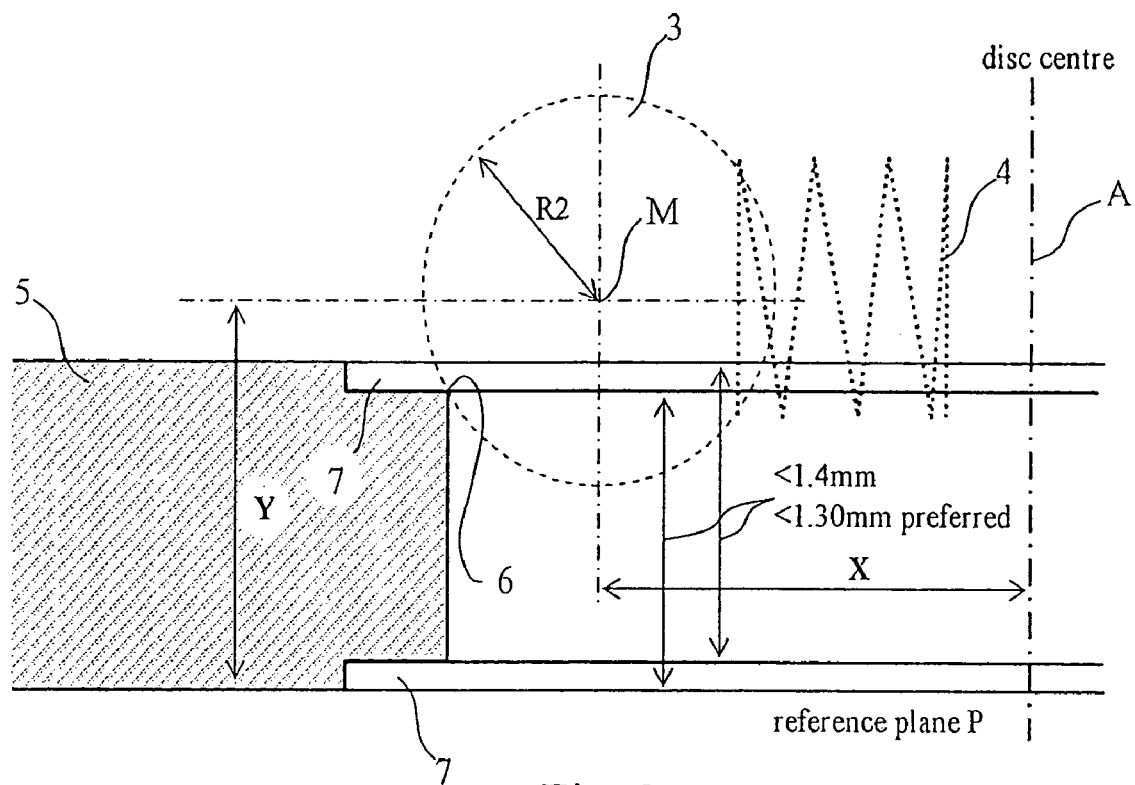
FIG. 2 shows inner edge shapes of discs according to the present invention.

FIG. 2a shows a situation in which a disc substrate 5 according to the present invention, which is e.g. 1.5 mm thick, is chucked. The disc substrate 5 has an inner edge position determined according to the present invention, i.e. a position of an inner edge 6 of the centre hole is defined by a distance y≦1.4 mm+R2·sin(45°), preferably y≦1.30 mm+R2·sin (45°), of a centre M of the ball 3 with radius R2 to the reference plane P, when a distance x=R1−R2·sin(45°) of the centre M of the ball 3 to the rotational axis A of the disc is given, with R1=7.5 mm nominally, i.e. the radius of a CD or DVD according to the standard. It can clearly be seen that the components of the force applied on the disc by the ball clamping mechanism are again more or less equally divided towards the reference plane P and parallel thereto pointing away from the disc centre. This is achieved by a step 7 in the disc substrate so that the thickness in an inner edge portion of the disc is <1.4 mm or preferably <1.30 mm when measured from the reference plane P. Preferably such a step is provided on both inner edges of the disc, as shown in FIG. 2a).

An inner edge according to the present invention might be rounded or chamfered over or show another arbitrary shape, as long as the conditions of the present invention are met.

Figure 2B:
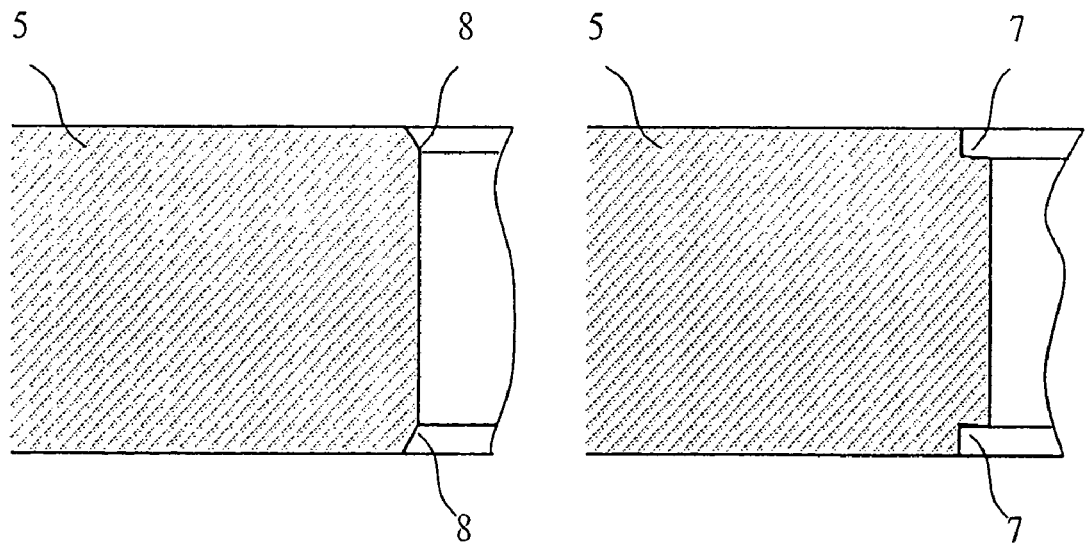

FIG. 2b shows on its left-hand side slanted inner edges 8 of the centre hole so that a phase is provided, which might have an angle between 0° to approximately 60°, as indicated in FIG. 2a), and on its right-hand side a comparable inner edge part of a disc according to the present invention which has steps 7 at both inner edges. In both cases the conditions as set out above might be fulfilled to improve the chucking of "thick" discs to be comparable to today's normal 1.2 mm discs.

Figure 3:
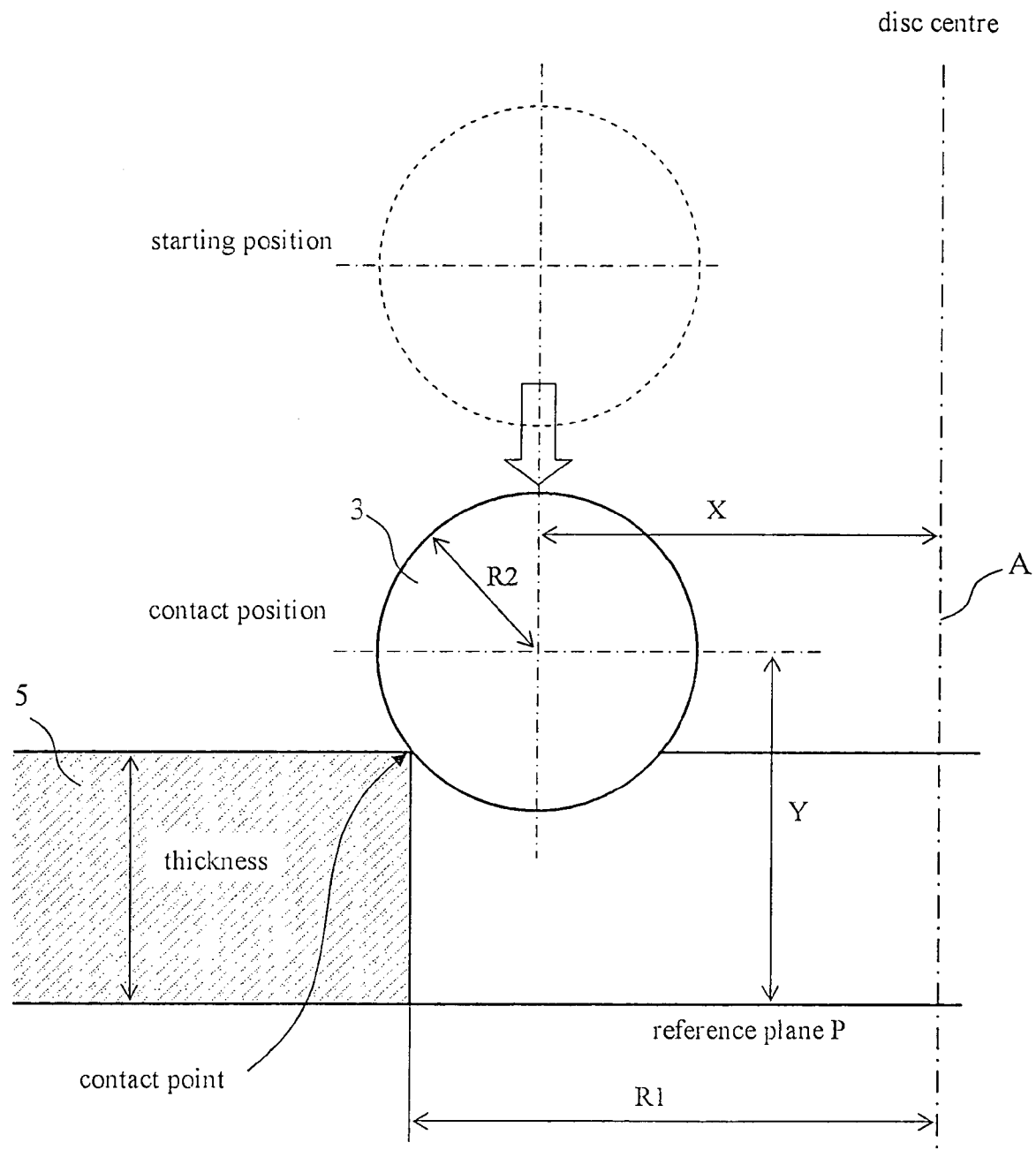
FIG. 3 shows a test apparatus for the inner edge shape according to the present invention.

FIG. 3 outlines a testing equipment to evaluate whether or not a disc 5 fulfils the conditions defined for the inner edge according to the present invention. In particular, a ball 3 with radius R2 is initially positioned high above the reference plane P, e.g. at a distance >2Y above the reference plane P, and at a distance X from the disc centre, i.e. the rotational axis A, of the disc 5 to be tested that is positioned on the reference plane P. Then the ball 3 is moved towards the disc 5 in parallel to the axis A until it touches the inner edge 6 of the disc 5 that has a radius R1 from the rotational axis A. At this position the distance Y of the centre M of the ball 3 is determined to evaluate whether or not the disc 5 fulfils the conditions for the inner edge as defined according to the present invention.

Figure 4A:
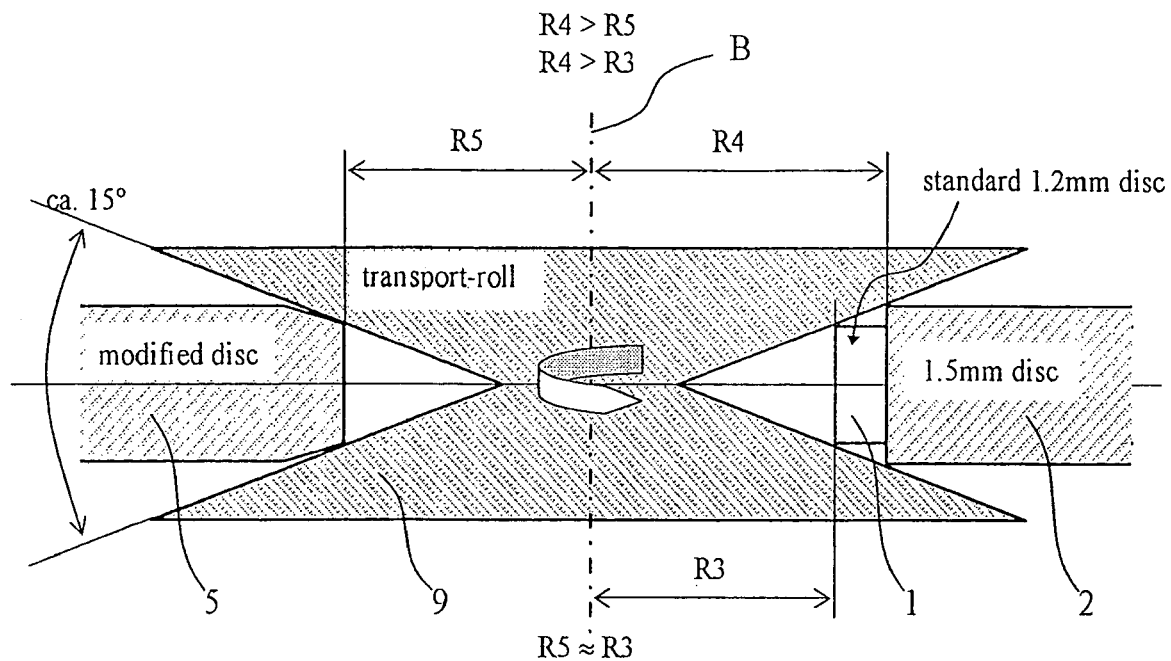
FIG. 4 shows outer edge shapes of current discs and discs according to the present invention.

FIG. 4a) shows on its right-hand side the position of a conventional 1.2 mm disc 1 and a conventional 1.5 mm disc 2 in a transport-roll 9 of a slot-in loading mechanism and on its left-hand side a 1.5 mm disc 5 with an outer edge according to the present invention in the same roll 9 of the slot-in loading mechanism. The roll 9 shows a v-shaped cut-in in which the discs abut against the transport-roll 9. It can be seen that the conventional 1.2 mm disc is touching the moveable transport-roll 9 of the loading mechanism at a radius R3 in respect to a rotational axis B of this moveable transport-roll 9, whereas the conventional 1.5 mm disc touches said moveable transport-roll 9 at a radius R4 that is larger than the radius R3, which might limit the movement of the transport-roll 9 within the slot-in loading mechanism so that such a conventional 1.5 mm disc 2 can not be loaded or unloaded. The 1.5 mm disc 5 with an outer edge or rim according to the present invention touches the moveable transport-roll 9 at a radius R5 comparable to the radius R3 in which the conventional 1.2 mm disc touches the moveable transport-roll 9 so that the loading and unloading of the "thick" disc according to the present invention in standard players/drives with a slot-in mechanism is no problem.

An outer edge according to the present invention might be rounded or chamfered over or show another arbitrary shape, as long as the conditions of the present invention are met. The lower and the upper edge may have a different shape but it is preferred that both edges have the same shape.

Figure 4B:
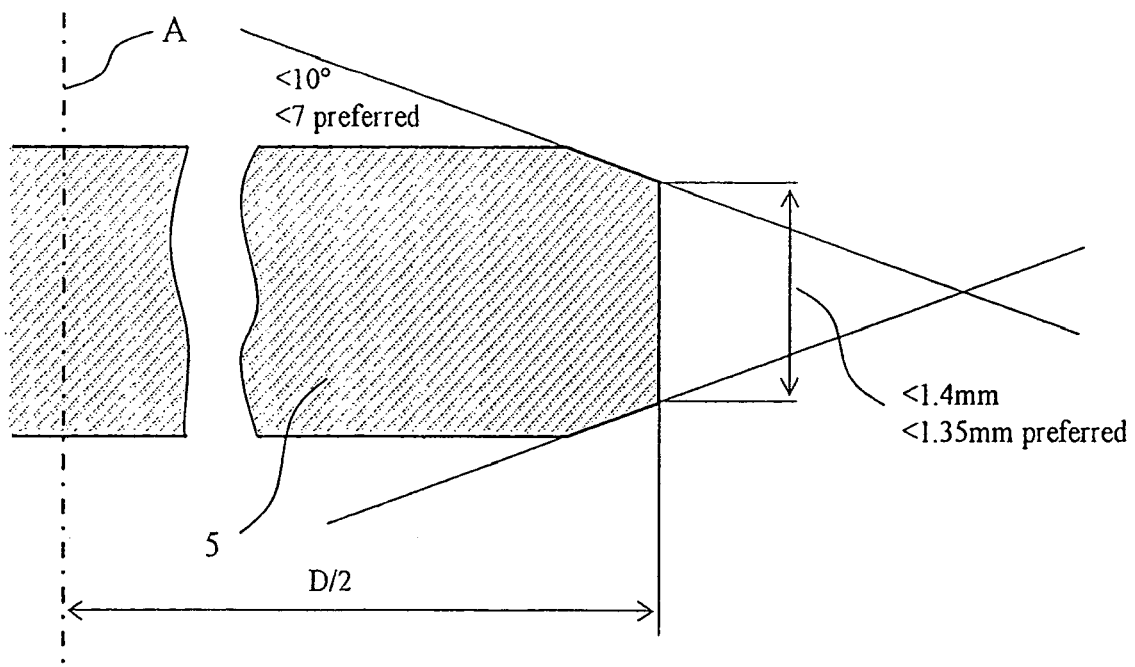

FIG. 4b) shows that the outer edge or rim portion of the disc 5 according to the present invention are e.g. built by surfaces slanted by an angle smaller ±10° or preferably smaller ±7° in respect to the disc side surface, i.e. the reference plane P, and having a distance <1.4 mm, preferably <1.35 mm at a radius of D/2 from the rotational axis A of the disc 5.

Figure 5A:
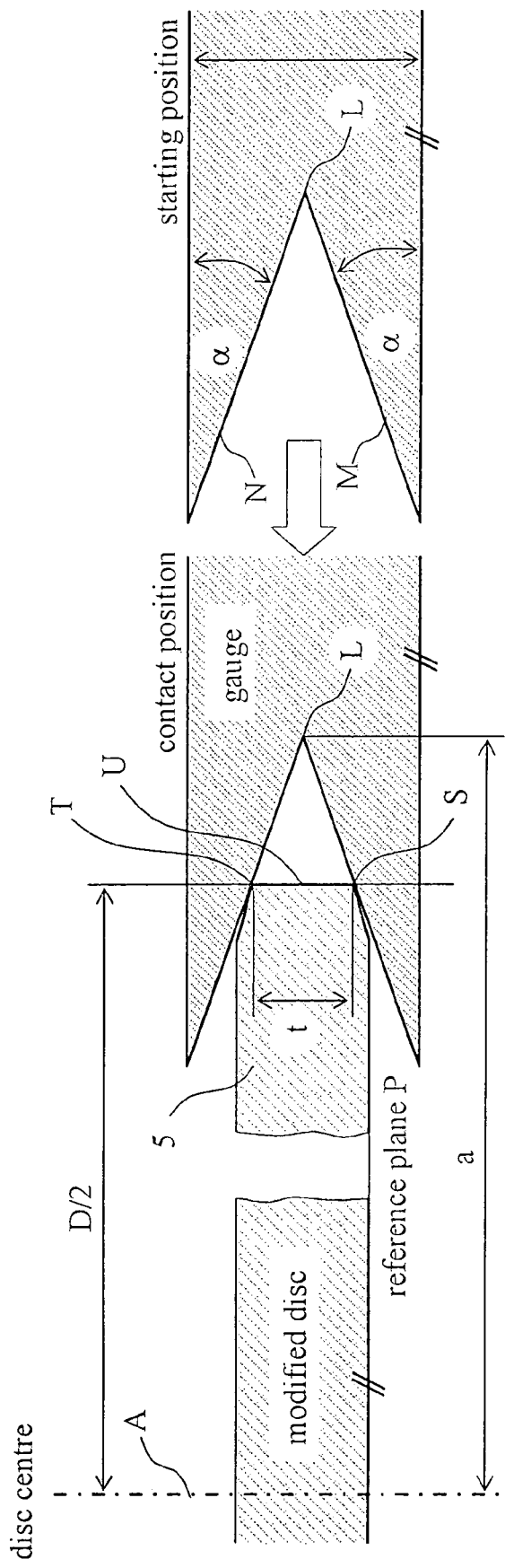
FIG. 5 shows a test apparatus for the outer edge shape according to the present invention and examples for alternate shapes for the outer edge.
Figure 5A:
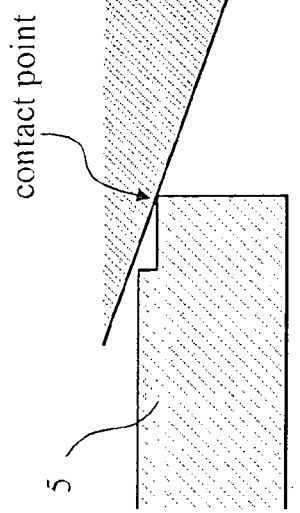
Figure 5A:
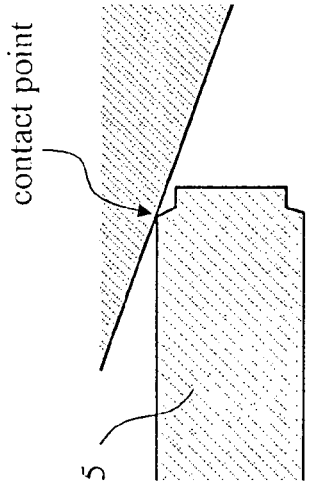

FIG. 5a outlines a testing equipment to evaluate whether or not a disc 5 fulfils the conditions defined for the outer edge according to the present invention. In particular, a gauge 10 that is formed of a block having a height above that of the disc 5 to be tested and a v-shaped cut-in portion is initially positioned at a distance far away, e.g. a distance >2a, from the disc centre, i.e. the rotational axis A of a disc 5 to be tested, and so that the disc to be tested will touch the v-shaped cut-in portion in case the gauge 10 is moved towards the disc 5 to be tested that is positioned on the reference plane P. The v-shaped cut-in portion is formed by building two planes with a angle of ±α to the upper and lower surfaces of the block that are parallel to the reference plane P to project into the block. Then the gauge 10 is moved towards the disc 5 in parallel to the reference plane P until it touches the outer edge of the disc 5. At this position the distance of a crossing line of the two planes projecting into the block to the rotational axis A is determined to evaluate whether or not the disc 5 fulfils the conditions for the inner edge as defined according to the present invention.

Therewith, with the help of the gauge 10 it can be determined whether or not the outer edge is defined so that a distance from a rotational axis of the disc shaped optical record carrier 5 to a crossing line L of an upper plane N and a lower plane M is a $\leq D/2+t/2\cdot\cot(\alpha)$, when
- the crossing line L is perpendicular to a rotational axis of the disc shaped optical record carrier,
- the lower plane M is slanted by an angel a in respect to a reference plane P of the disc shaped optical record carrier to be tested and touches the outer edge from below,
- the upper plane N is slanted by an angel $-\alpha$ in respect to the reference plane P and touches the outer edge from above,
- D is the nominal diameter of the disc shaped optical record carrier,
- α=7.5°, and
- t is the distance between a line S and a line T, wherein
  - the line S is defined by the crossing line between a plane U and the lower plane M,
  - the line T is defined by the crossing line between the plane U and the upper plane N, and
  - the plane U is perpendicular to the reference plane P and in parallel to the crossing line L and at the distance D/2 from the rotational axis A.

The upper and lower planes N, M define the v-shaped cut-in portion of the gauge 10.

In the sense of the present invention a distance of a point or a straight line to a straight line or a plane is always the shortest possible distance.

Figure 5B:
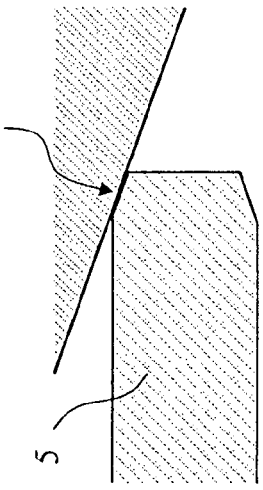

FIG. 5b shows three exemplary outer edge shapes according to the present invention. On the left hand side the slanted outer outlined above edge is shown that in this case forms a contact area with the gauge 10, since the angle of the slanted surface of the disc 5 is equal to that of the v-shaped cut-in portion of the gauge 10. In the middle an outer edge is shown that has a recess so that a contact point with the gauge is formed on the top surface of the disc 5. On the right hand side an outer edge is shown that has a recess so that a contact point with the gauge is not formed on the top surface of the disc 5, but on a circumferential surface thereof.

Therefore, according to the present invention it is secured that
1. discs with a thickness of more than 1.4 mm or 1.5 mm can be played in disc players/drives using ball clamping or similar clamping, because the discs according to the present invention can properly be chucked;
2. discs with a thickness of more than 1.4 mm or 1.5 mm can be properly inserted and ejected by disc players/drives which are using a slot-in mechanism, since the disc shape or the centre hole and the circumference of such "thick" discs is improved towards the properties of a currently manufactured 1.2 mm disc.

The modifications in respect to almost all discs from the market, which show a thickness between 1.1 mm and 1.3 mm, since the specification for the compact disc and DVD allows a nominal thickness of 1.2 mm and a maximum overall thickness of 1.5 mm consider that some player/drive manufacturers did not consider the maximum thickness specification of 1.5 mm, but designed the players/drives for the maximum thickness of about 1.3 mm.

In particular, according to the present invention it is considered that some players/drives with "ball clamping" or a similar type can not chuck 1.5 mm discs, since the distance Y of the reference plane P to the centre of the spring-loaded ball 3 is too small and therefore the vertical force which holds the disc on the chuck becomes too small. According to the present invention the shape of the centre hole is changed as described above so that also the 1.5 mm disc or discs with a higher thickness can be chucked properly even if the player/drive was designed to chuck a thinner disc.

The second modification according to the present invention considers that the clamping area of "thick" discs should have a thickness between 1.1 mm and 1.5 mm, further preferably between 1.1 mm and 1.4 mm, further preferably between 1.2 mm and 1.4 mm in particular of 1.4 mm, so that clamping mechanisms that provide a clamping by way of a clamping stamper that touches one clamping area of the disc and presses the other clamping area of the disc against a support plate of the disc player/drive can properly hold such discs.

The third modification according to the present invention considers that some players/drives with a slot-in mechanism cannot load or can hardly load 1.5 mm or thicker discs or, when they have loaded the discs, they cannot eject the discs. This problem is due to a usage of a moveable roll 9 which is tapered towards the centre and which touches the discs at the outer edge in such loading mechanisms. When thicker discs are inserted, the distance at which the moveable roll 9 touches the disc from the rotational axis B of the moveable roll 9 becomes bigger and due to mechanical limitations in some players/drives the movement of the roll 9 is limited and the disc can not be loaded or unloaded. According to the present invention the shape of the circumference is changed as described above so that 1.5 mm or a thicker disc can be loaded or unloaded without problems, since the distance in which the moveable roll 9 touches the disc is reduced to values achieved by conventional 1.2 mm discs.

Figure 6:
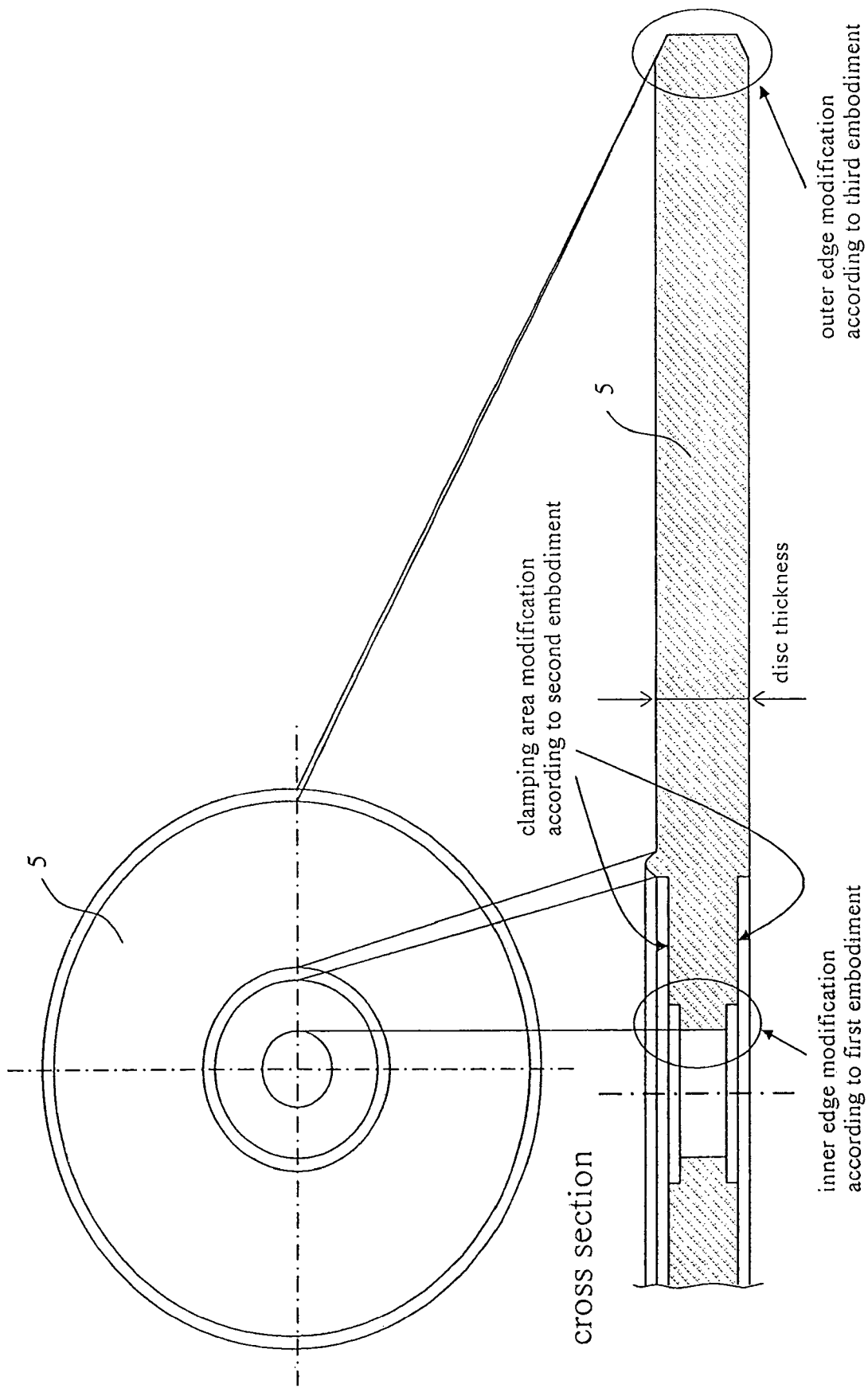
FIG. 6 shows a disc comprising all proposed disc shape modifications according to the present invention.

Therefore, the present invention provides a disc shaped optical record carrier with special disc shape modifications at the inner edge (edge of the centre hole), and/or the clamping area, and/or the outer edge (edge in rim area) so that the disc that are thicker than the currently manufactured discs can be properly played back although the current playback devices are specially adapted to the currently manufactured discs. FIG. 6 shows such a disc comprising all three disc shape modifications according to the present invention and also indicates that the disc thickness according to the present invention is the thickness of the disc in an information area.

The invention claimed is:

1. A disc shaped optical record carrier, comprising:
   a disc shaped optical record carrier body having a thickness of greater than 1.4 mm and having a center hole integrally formed therethrough with a predetermined radius R1 centrally around a rotational axis of the disc, said center hole extending from a first side to a second side;
   said center hole defining first and second inner edges on said first and second sides of said disc shaped optical record carrier, and
   a portion of said optical record carrier body adjacent to said center hole having a first clamping area and a second clamping area extending radially along said first and second inner edges, respectively, wherein
      said first and second clamping areas are recessed and the recesses have substantially equal depth on said first and second sides, the recesses extending along said first and second inner edges and having a first diameter,
      a portion of said first clamping area and a portion of said second clamping area is further recessed and the further recesses have substantially equal depth on said first and second sides, the further recesses extending along said first and second inner edges and having a second diameter smaller than the first diameter of said first and second clamping areas, and
      the further recesses are configured to directly receive a ball clamp.

2. The disc shaped optical record carrier according to claim 1, wherein the further recesses are configured to receive a ball probe in a ball clamp mechanism having a radius R2 that is in an inclusive range of 0.5 mm and 2 mm.

3. The disc shaped optical record carrier according to claim 2, wherein a position of an inner edge of the center hole is defined by a distance $y \leq 1.4$ mm $+ R2 \cdot \sin(45°)$ of a center of the ball probe to a plane in which the clamping surface of the opposite disc side lies, when a distance $x = R1 - R2 \cdot \sin(45°)$ of the center of the ball probe to the rotational axis of the disc is given, where R1 is between 7.5 mm and 7.575 mm.

4. The disc shaped optical record carrier according to claim 1, wherein the radius R1 of the center hole is between 7.5 mm and 7.575 mm.

5. The disc shaped optical record carrier according to claim 1, wherein said optical record carrier body comprises a DVD substrate on the first side of the disc shaped optical record carrier and a CD substrate on the second side of the disc shaped optical record carrier, the DVD substrate and the CD substrate being bonded together.

6. The disc shaped optical record carrier according to claim 5, wherein a distance between a first recess of the further recesses and said CD surface or between a second recess of the further recesses and said DVD surface is less than 1.3 mm.

7. The disc shaped optical record carrier according to claim 5, wherein a thickness of the DVD substrate is between 0.53 mm and 0.59 mm.

8. The disc shaped optical record carrier according to claim 5, wherein a thickness of the CD substrate is between 0.8 mm and 1.0 mm.

9. The disc shaped optical record carrier according to claim 5, wherein a thickness of a bonding agent between the DVD substrate and the CD substrate is between 0.01 mm and 0.04 mm.

10. The disc shaped optical record carrier according to claim 1, wherein said first and second inner edges are chamfered.

* * * * *